Patented Jan. 18, 1944

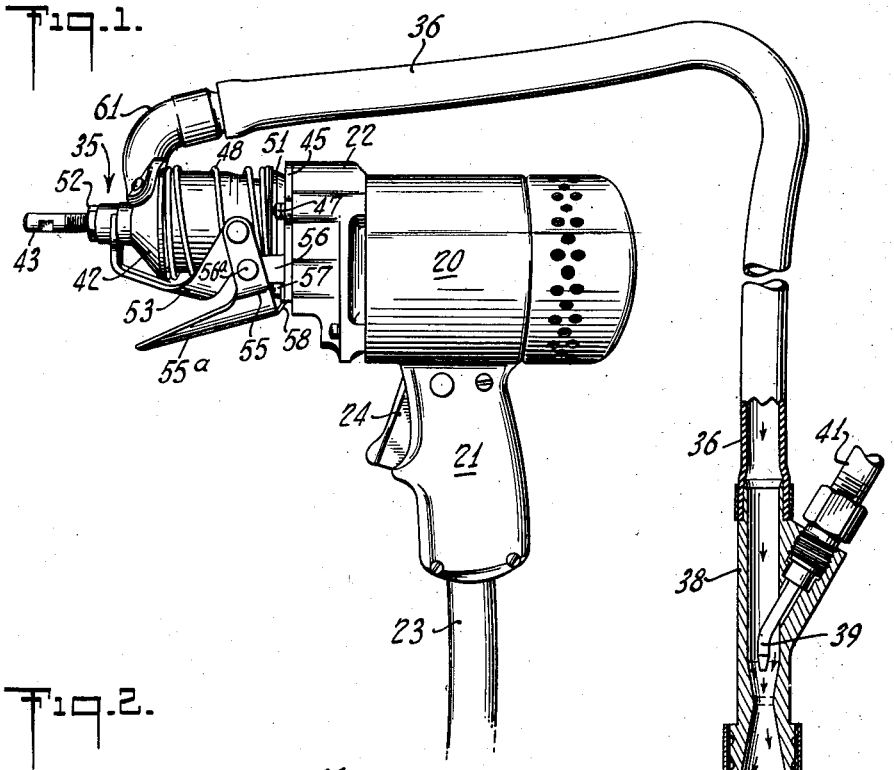
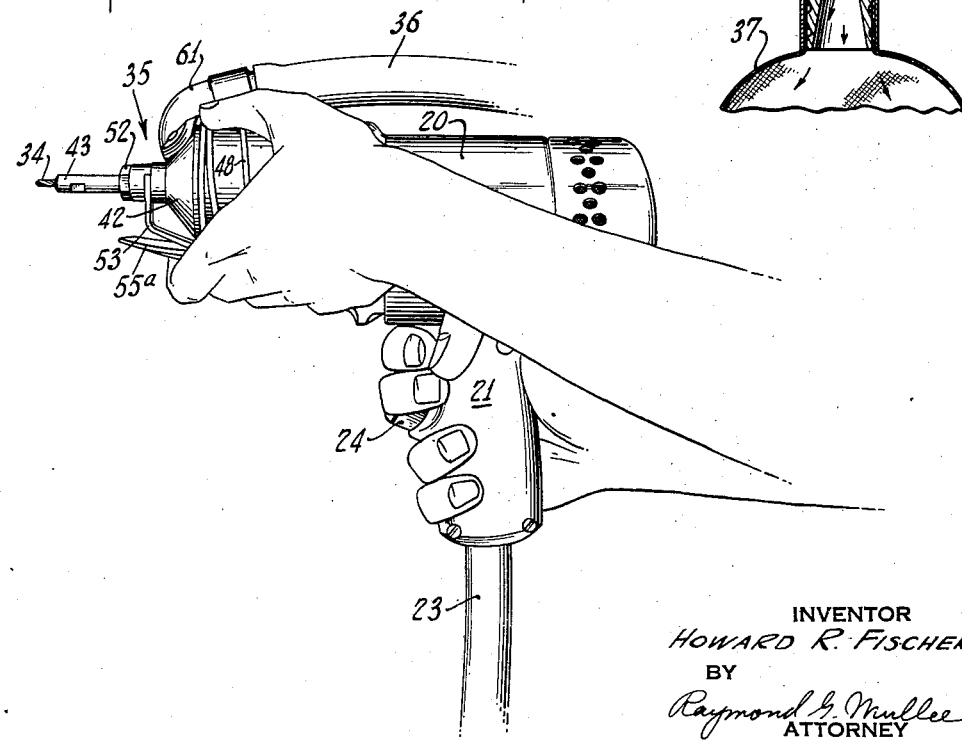

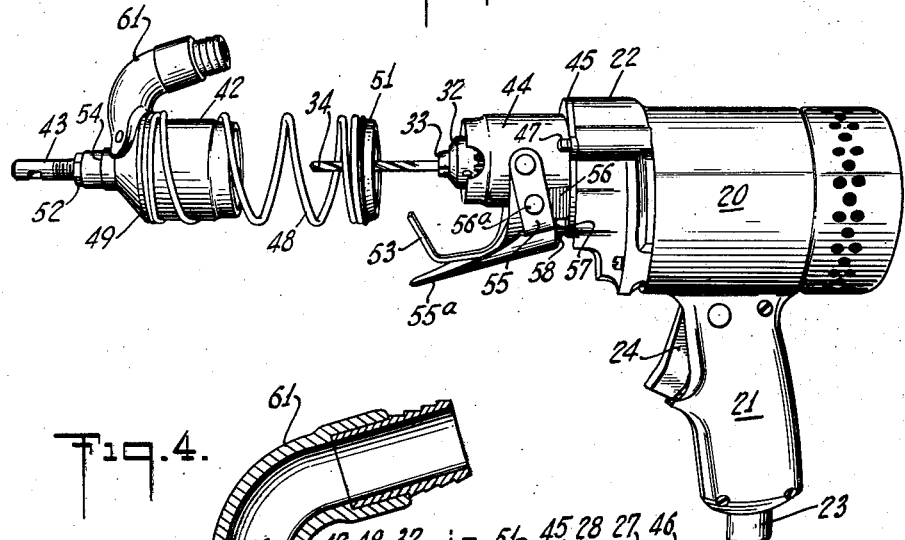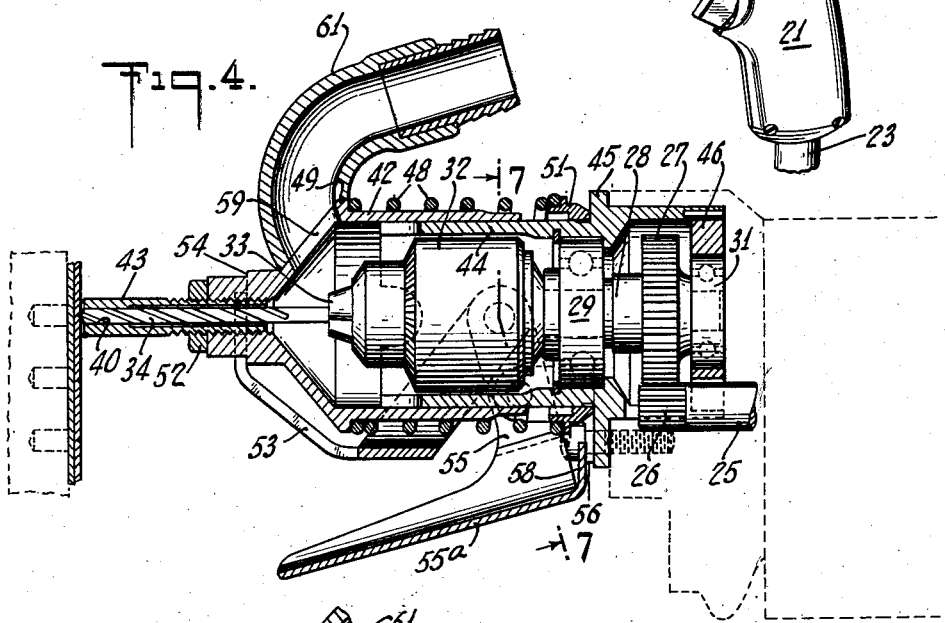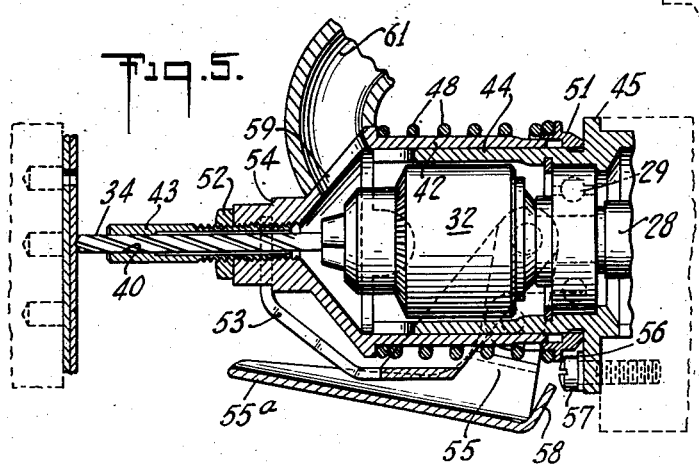

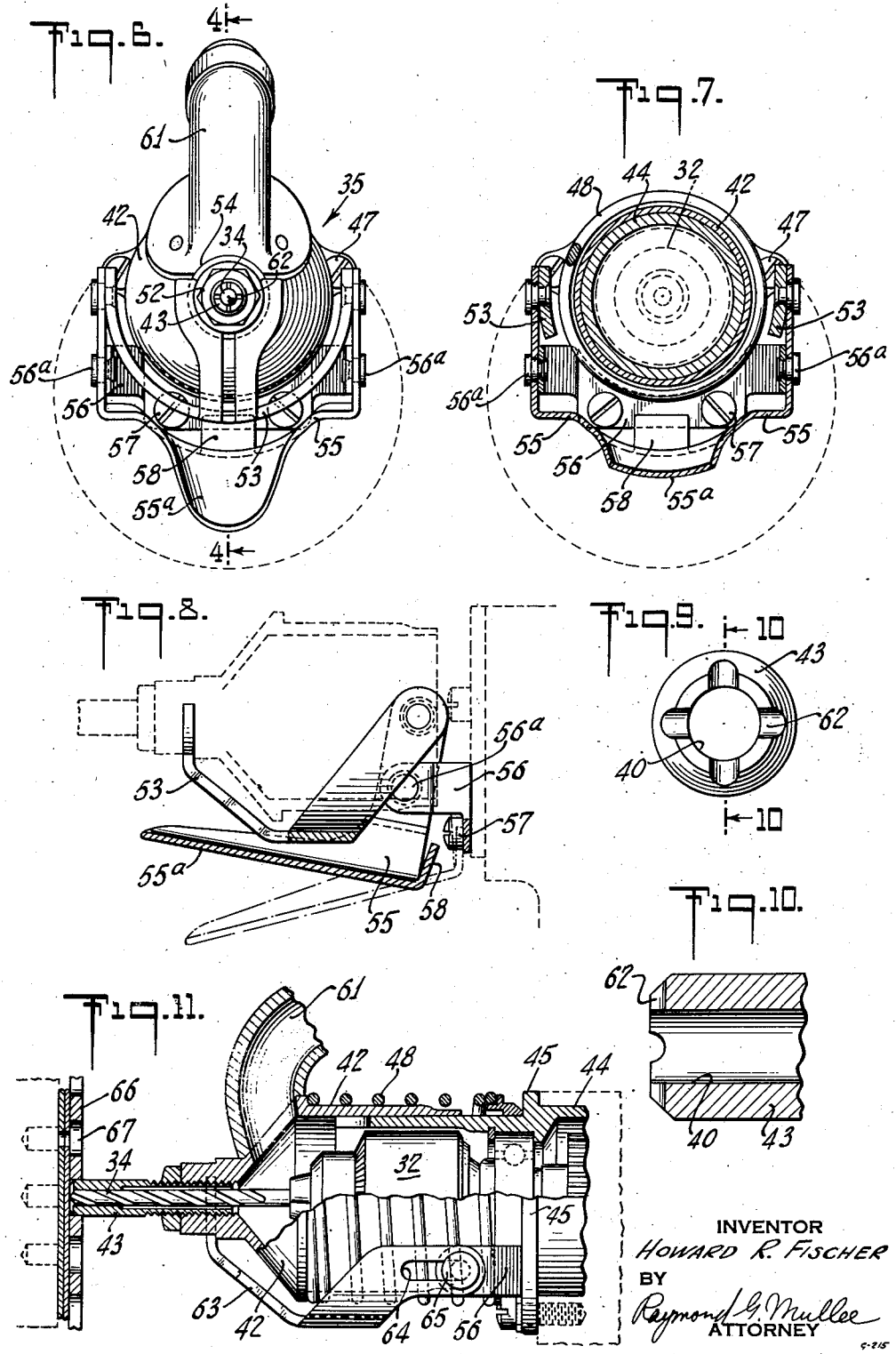

2,339,324

UNITED STATES PATENT OFFICE 2,339,324

HOLD-DOWN AND CHIP COLLECTING ATTACHMENT FOR DRILLS

Howard R. Fischer, Detroit, Mich., assignor to Chicago Pneumatic Tool Company, New York, N. Y., a corporation of New Jersey Application December 9, 1941, Serial No. 422,200

17 Claims. (Cl. 77—55)

This invention relates to attachments for drilling and like tools designed to control the disposal of dust particles created by the drill.

In its broader aspects the invention is similar to that disclosed in Patent No. 2,246,916, issued June 24, 1941, to H. R. Fischer. Like the device of that patent the present invention is concerned principally with problems of sheet metal drilling which have been especially troublesome in the aircraft industry. In preparing the metal skin covering of airplanes for riveting, a twist drill is driven through the overlapping portions of a pair of sheets in a series of predetermined positions to form the rivet holes. If no provision is made for holding the metal sheets firmly together a projecting burr is formed on both sheets around the drilled hole. The sheets thereby are held in an uneven spaced relation, which condition is maintained and intensified throughout continued drilling operations as the chips and cut particles work their way outward between the sheets. The presence of the burrs adds to the difficulties entailed in joining the sheets together, while the necessity of first removing the metal particles from between the sheets represents a loss in time and labor.

In the Patent 2,246,916 an attachment, applicable to the conventional hand held rotary power drill, is disclosed which embodies hold down means acting during drilling to press the outer of the work sheets into contact with the inner sheet, and further embodies means for generating an air current which constantly picks and exhausts particles from the region of the drill hole and deposits them in a remote dust receptacle. The present invention contemplates the performance of the same functions but provides a device which, when compared with the earlier structure, is more simple, has fewer parts and may be more easily and rapidly controlled.

To modify and improve upon the device of Patent 2,246,916 in these respects is, therefore, a general object of the invention.

A more specific object is to facilitate manual shifting of the tubular attachment to and from working position. This object is attained through the cooperation of a spring urging the attachment from working position and manually operated linkage for effecting its retraction. The linkage includes a palm held lever underlying the drill in position to be operated by an opening and closing movement of the operator's hand. Since, to simplify positioning of the drill, the attachment is retracted and advanced before starting each new drill hole, the greater ease of operation afforded by the linkage of the present invention results in a general speed-up of the drilling.

Another object of the invention is to improve the method of entraining, in the current of air passing to the dust receptacle, those particles thrown outward from the drill by centrifugal force. To accomplish this object, the work engaging end of the tubular attachment is formed with radial grooves which constitute constantly open air passages circumferentially spaced around the drill.

Other objects and structural details of the invention will be apparent from the following description when read in conjunction with the accompanying drawings, wherein:

Fig. 1 is a view, in side elevation, of a portable drilling tool equipped with an attachment of the invention, showing a part of the dust disposal apparatus in longitudinal section and only a fragment of the dust bag;

Fig. 2 is a view of the assembly of Fig. 1, showing the manner in which the tool is held and operated, the tubular attachment being in this instance retracted from working position;

Fig. 3 is an exploded view, in side elevation, of the assembly of Fig. 1;

Fig. 4 is a fragmentary view of the tool, showing the attachment of Fig. 1 in longitudinal section advanced to working position;

Fig. 5 is a view similar to Fig. 4, showing the attachment in retracted position;

Fig. 6 is a front end view of the attachment of Fig. 1;

Fig. 7 is a view, in cross section, taken substantially along the line 7—7 of Fig. 4;

Fig. 8 is a detail view of the linkage provided for manual retraction of the attachment;

Fig. 9 is a front end view of the hold down portion of the attachment, this view being enlarged with respect to the other figures;

Fig. 10 is a view, in longitudinal section, taken substantially along the line 10—10 of Fig. 9; and Fig. 11 is a fragmentary view of the tool having an attachment of modified construction mounted thereon, the attachment being shown partly in side elevation and partly in longitudinal section.

The tool illustrated is one of a kind in common use in the aircraft industry, being especially adapted for hand support and powered for the drilling of light sheet metal such as aluminum alloy. Its outer casing includes a motor housing 20 mounted on a handle 21 and having secured to its front end an adapter 22. The adapter 22 supports the drill, and chuck mechanism therefor, which are driven by an electric motor contained in the housing 20. Current is supplied to the tool through a cable 23 leading to the handle 21. Electrical contacts (not shown) are opened and closed by a trigger 24 in the handle to connect and disconnect the motor and the source of current supply, thereby to start and stop operation of the tool. As shown in Fig. 4, the motor shaft 25 has a pinion 26 thereon meshing with a gear 27 secured to a spindle 28. The spindle parallels the motor shaft and is rotatably mounted in bearings 29 and 31 within the adapter 22. The outer end of spindle 28 projects through and beyond the adapter 22 and has a driving connection with a chuck 32, mounted thereon. The chuck 32 is conventional in form, being provided with a plurality of adjustable fingers 33 adapted to grip the shank of a twist drill 34 and lock it in the chuck for rotation therewith and with the spindle 28. In the operation of the tool, it is held in the hands of the operator, and, after the point of the drill has been located in drilling position, the trigger 24 is actuated to start the motor and thereby effect rotation of the drill. The tool is applied to the work with a steady pressure causing the drill to advance through the successive sheet laminations.

According to the present invention the chuck 32 and drill 34 are surrounded by a tubular attachment 35 the interior of which communicates, through a hose line 36, with a remote dust bag 37 (Fig. 1). The outer end of the hose line 36 is connected to the bag 37 by a Venturi tube 38 into which extends a compressed air discharge nozzle 39. By means of a separate hose line 41 air under pressure is supplied to the nozzle 39 and directed thereby through the Venturi tube to the dust bag 37. In this manner a jet device is formed which functions to exhaust the air from the hose line 36 and communicating areas. The front of attachment 35 being open to atmosphere, a steady stream of air, having its source adjacent the point of the drill and its terminus in the bag 37, flows through the attachment during operation of the jet device. The dust and chips in the region of the drill hole are entrained in this air curent and carried by it to the dust receptacle.

Referring particularly to Figs. 3 and 4, it will be seen that the tubular attachment 35 comprises a sleeve 42 and a sleeve extension 43, the latter being in the form of a drill guide having a longitudinal bore 40 for the passage of the drill therethrough. The sleeve assembly is coaxial with the drill and chuck 32 and is mounted on a cylinder 44 set in the adapter 22. Intermediate its ends the cylinder 44 is formed with an annular flange 45 engageable with the adapter 22. On one side of the flange 45 the cylinder lies within the adapter and supports a ring 46 within which the spindle bearing 31 is mounted. The other spindle bearing 29 has a mounting within the cylinder 44 just in advance of the flange 45. On the other side of the flange 45 the cylinder projects forwardly around the chuck 32 and has a telescopic connection with the sleeve 42. The cylinder 44 is fixed, being secured to the adapter 22 by bolts 47 passed through the flange 45. Surrounding the telescoping portions of the sleeve 42 and cylinder 44 is a helical spring 48 interposed between an annular shoulder 49 on the sleeve and a ring 51 surmounting the cylinder and abutting against the flange 45. Thus, sleeve 42 is pressed by spring 48 forward relatively to the drill 34, and, in cooperation with sleeve extension 43, tends completely to enclose the drill. In the operation of the tool, the sleeve assembly limits against the work while the drill and tool body advance relatively thereto. The spring 48 thereby is placed under increased tension and presses the sleeve extension 43 into engagement with the work with increased intensity. During drilling, therefore, the extension 43 functions as a hold down portion of the sleeve, acting under the force of spring 48 to press the outer work sheet into firm engagement with the inner sheet. The hold down pressure is maintained throughout the drilling operation and until the point of the drill is withdrawn from the work and again surrounded by the sleeve extension.

The forward end of the sleeve 42 is reduced in diameter to receive the extension 43 which is adjustably secured therein in order that variations in drill length may be compensated for by varying the projecting length of the extension. The connection between the sleeve and extension thereof is effected through the engagement of complementary threaded portions thereon, while a lock nut 52 is provided for securing the extension in a set position of adjustment. Preferably the sleeve assembly normally occupies a position in which the work engaging end of the hold down portion 43 lies adjacent the point of the drill where it may contact the work immediately upon starting the drill hole. To this end forward movement of the assembly relative to the drill is limited by linkage conected at one end to the adapter 22 and at the other end to the assembly, and operable to retract the assembly from normal working position. Included in this linkage is a yoke shaped stop member 53 (see also Figs. 6–8) which underlies the sleeve 42 and has a forwardly extending bifurcated neck portion embracing the sleeve at a point in front of an abutment shoulder 54 thereon. The separate arms of the stop member 53 extend upwardly and rearwardly on opposite sides of the sleeve 42 and are pivotally connected to the respective upstanding arms of a yoke shaped bell-crank lever 55. The arms of lever 55 are pivotally mounted on trunnions or rivets 56a supported by a pair of bent over ears on a bracket 56 which is fixed to the cylinder flange 45 by bolts 57. The lever 55 thus may be rocked about an axis transverse to the longitudinal axis of the drill. Below the trunnions 56a the lever 55 has an arm 55a extending forwardly beneath the link 53 and shaped to fit within the palm of the operator's hand to facilitate manual movement of the lever about its pivot. At its inner end the arm 55a has a tail portion 58 engageable with the bracket 56 to limit movement of the lever 55 and associated linkage in one direction. Through the frictional contact between sleeve shoulder 54 and the neck of link 53 the control linkage is maintained normally in operative engagement with the sleeve. The pressure of spring 48 maintains the sleeve 42 in its maximum position of advancement which position is determined by the extent of rocking motion permitted the lever 55. Through the action of the spring and of the tail stop 58 on lever 55 the parts normally are held in the position shown in Figs. 1 and 4. To retract the sleeve 42, to expose a greater portion of the point of the drill and thereby facilitate its placement in a predetermined drilling position, the lever 55 may be rocked in a clockwise direction (Fig. 4) to move the link 53 rearward and thereby enforce a similar movement of the sleeve and extension 43 thereof (see Fig. 5). The link 53 preferably is made of spring steel to insure against binding of the parts.

As shown in Fig. 2 a tool equipped with the present attachment may be held and operated in the manner customary in the use of such tools. One hand is placed on the handle 21 with the fingers in position to operate the trigger 24, while the other hand grasps the tool forwardly of the handle in order to aid in rapid and accurate positioning of the drill point. In the present instance, the elements of the hold down chip exhauster are arranged to lie within the grasp of the forwardly positioned hand. The actuating arm 55ª, by which movement of the attachment to advanced and retracted positions is controlled, may be held in the fingers or palm of the hand and operated without it being necessary for the operator to shift or otherwise change the position of his hands on the tool. When one drill hole is completed the tool is withdrawn from the work; the lever 55 is rocked, by a squeezing action, about its pivot to retract sleeve 42 and expose the point of the drill, which then is placed in a new drilling position; the lever 55 is released, allowing spring 48 to advance the sleeve assembly into engagement with the work; and the tool body pressed forward with a light pressure while the trigger 24 is actuated to start the motor and initiate drilling.

The chips of cut material and dust are carried to the interior of the sleeve 42 by the flutes of the drill, their progress being aided by the current of air entering the front of sleeve extension or hold down portion 43 and flowing rearwardly around the drill through the bore 40. Inside the sleeve the chips and dust join the air current and are carried thereby through a peripheral opening 59 in the sleeve into a registering gooseneck 61, to which the hose line 36 is connected, and thence to the dust bag 37. Since it is the function of the attachment constantly to pick and exhaust the chips during drilling and while the tool is being withdrawn from the drill hole, it is necessary to maintain the air stream in substantial volume while the front of sleeve extension 43 is pressed against the work. Therefore, as shown particularly in Figs. 9 and 10, the work engaging end of the hold down extension 43 is formed with a series of radial grooves 62 open constantly for the passage of air to the longitudinal bore 40. The air current thus originates immediately adjacent the drill hole and enforces the entrance of all dust particles into the sleeve, including those thrown from the drill by centrifugal force outward along the surface of the work.

The linkage for controlling advancement and retraction of the sleeve assembly may be dispensed with without impairing the efficiency either of the hold down means or exhaust means of the attachment. A modification of the invention, in which the bell-crank lever 55 is omitted, is illustrated in Fig. 11. In this case a stop member or link 63 replaces the corresponding element 53 of the first embodiment, the link 63 being mounted directly on the bracket 56 by a lost motion connection permitting a relative shifting movement of the link and sleeve assembly. The lost motion between the link and bracket is obtained through pin and slot connections 64, 65, one for each arm of the link. The modification of Fig. 11 is most advantageously used with a jig which will guide the drill and render manual positioning thereof unnecessary. This jig, one of which is shown at 66 in Fig. 11, is formed with a series of perforations 67 and is adapted to be superimposed on the outer work sheet with the perforations therein aligned with the predetermined drilling positions. The diameter of each opening 67 is of a size only to admit the sleeve extension 43 which is inserted in a selected opening to bring the drill point to drilling position. The sleeve extension engages and holds down the work as before, the attachment of this embodiment of the invention functioning in the same manner as that first described except that the sleeve assembly is not retracted between the drilling operations.

What is claimed is:

1. In a drilling or like tool having a stationary support and a rotatable drill projecting therefrom, the combination of a sleeve mounted on said stationary support and encircling said drill, said sleeve being shiftable to advanced and retracted positions relative to said drill to expose a lesser and greater portion of the outer end thereof, a yielding means urging said sleeve to advanced position, and means for moving said sleeve to retracted position and for controlling its movement to advanced position.

2. A drilling or like tool according to claim 1, characterized in that said last named means includes a stop defining the advanced position of said sleeve.

3. In a drilling or like tool having a stationary support and a rotatable drill projecting therefrom, the combination of a sleeve mounted on said support and encircling said drill, said sleeve being shiftable to advanced and retracted positions to expose a lesser and a greater portion of the outer end of the drill, a stop defining the advanced position of said sleeve, and means for moving said stop to retract said sleeve.

4. In a drilling or like tool having a stationary support and a rotatable drill projecting therefrom, the combination of a sleeve supported by said support for reciprocable movement relative to said drill and surrounding said drill, a spring interposed between abutments on said sleeve and said support urging said sleeve outward relatively to said drill to engage and hold down the work, and means for retracting said sleeve against the pressure of said spring and for controlling the outward movement of said sleeve.

5. A drilling or like tool according to claim 4, characterized in that said means comprises linkage connecting said sleeve and said stationary support acting to limit outward movement of said sleeve and adapted for manual operation to retract said sleeve.

6. In a drilling or like tool having a stationary support and a rotatable drill projecting therefrom, an assembly for catching dust particles thrown from the drill by centrifugal force outward along the surface of the work, comprising a sleeve mounted on said stationary support for reciprocable movement relative to said drill and surrounding said drill, a work engaging hold down portion closing the outer end of said sleeve and formed with a longitudinal bore permitting the passage of the drill therethrough and communicating the interior of the sleeve to atmosphere, a spring interposed between said sleeve and said support acting to press said sleeve in a direction to engage said hold down portion with the work, means for exhausting the interior of said sleeve to generate a current of air flowing inward through said hold down portion from the region of the drill hole, and a series of radial grooves formed in the outer end of said hold down portion, said grooves constituting constantly open air passages to which flow streams of air over the surface of the work.

7. In a drilling or like tool having a stationary support and a rotatable drill projecting therefrom, the combination of a sleeve mounted on said stationary support for reciprocable movement relative to said drill and surrounding said drill, a work engaging hold down portion at the outer end of said sleeve having an aperture for the passage of the drill therethrough and movable with said sleeve, means positively defining an advanced limit of movement of the assembly comprising said sleeve and said hold down portion, yielding means urging said assembly to advanced position independently of said drill, and retraction means for said assembly comprising a manually operable lever mounted for oscillation about an axis transverse to the longitudinal axis of said drill and extending alongside said sleeve in position to be encompassed therewith by the hand of the operator.

8. In a drilling or like tool having a stationary support and a rotatable drill projecting therefrom, the combination of a tubular hold down attachment reciprocably mounted on said stationary support and surrounding said drill, yielding means urging said attachment outward independently of said drill whereby operation of the tool is accompanied by a pressure of said attachment against the work, and means for retracting said attachment from working position comprising manually operable linkage connected at one end to said stationary support and at the other end to said attachment and including an actuating lever extending alongside said sleeve in position to be encompassed therewith by the hand of the operator.

9. In a drilling tool, an assembly for catching dust particles thrown from the drill by centrifugal force outward along the surface of the work, comprising a tubular attachment adapted to be mounted on the front of the tool, and including a hold down portion surrounding the drill and engageable with the work during a drilling operation, means for generating a current of air flowing from the region of the drill point through said hold down portion to the interior of said attachment, and a plurality of radial grooves in the work engaging end of said hold down portion constituting constantly open air passages to which flow streams of air over the surface of the work.

10. An attachment for drilling and like tools, comprising a sleeve mounted on the front of the tool to encircle the drill and reciprocable relatively thereto, a helical spring surrounding said sleeve and based on said tool body urging said sleeve in a direction to engage it with the work, and a link intermediate said sleeve and the tool body having a neck portion adapted to embrace said sleeve and limit movement thereof by said spring.

11. An attachment for drilling and like tools, comprising a sleeve mounted on the front of the tool to encircle the drill and reciprocable relatively thereto, a helical spring surrounding said sleeve and based on said tool body urging said sleeve in a direction to engage it with the work, a link intermediate said sleeve and the tool body having a neck portion adapted to embrace said sleeve and limit movement thereof by said spring, and a bell-crank lever pivotally mounted on said tool body having one arm connected to the link and the other arm arranged for manual operation, whereby to rock said lever and retract said link and thereby said sleeve.

12. An attachment for drilling and like tools, comprising a sleeve mounted on the front of the tool to encircle the drill and reciprocable relatively thereto, means for controlling reciprocation of said sleeve including a link connected at its forward end to said sleeve and extending rearwardly toward the tool body, and a bell-crank lever pivotally mounted on the tool body having one arm connected to the rearward end of said link and the other arm arranged for manual operation.

13. In a drilling or like tool having a stationary support and a rotatable drill projecting therefrom, the combination of a work engaging hold down sleeve surrounding said drill and reciprocable relatively thereto to and from working position, a stop member engageable with said sleeve to limit movement thereof in one direction, and a lever pivotally mounted on said stationary support and connected at one end to said stop member and having provision at its other end for manual adjustment about its pivot to move said stop and thereby said sleeve in one direction and to control the movement thereof in the opposite direction.

14. A portable drilling tool of the class which is held in forwardly and rearwardly positioned hands of the operator when in use, comprising a stationary housing adapted for the grasp of the rearwardly positioned hand of the operator, a rotatable drill projecting forwardly from said stationary housing, a tubular attachment surrounding said drill and supported by said housing for sliding movement longitudinally of said drill, said attachment being shiftable forward to engage and hold down the work while drilling and shiftable rearward to expose the point of the drill for ready positioning thereof in starting a new hole, and manually operable linkage disposed for the grasp of the forwardly positioned hand of the operator for shifting said attachment rearward and for controlling its movement forward.

15. A portable drilling tool of the class which is held in forwardly and rearwardly positioned hands of the operator when in use, comprising a stationary housing adapted for the grasp of the rearwardly positioned hand of the operator, a rotatable drill projecting forwardly from said stationary housing, a cylindrical housing extension surrounding said drill, a tubular attachment in telescopic connection with said extension and shiftable forward to engage and hold down the work while drilling and shiftable rearward to expose the point of the drill for ready positioning thereof in starting a new hole, a helical spring surrounding said extension and said attachment and urging said attachment forward, and means within the grasp of the forwardly positioned hand of the operator for retracting said tubular attachment against the pressure of said spring.

16. A portable drilling tool of the class which is held in forwardly and rearwardly positioned hands of the operator when in use, comprising a stationary housing adapted for the grasp of the rearwardly positioned hand of the operator, a rotatable drill projecting forwardly from said stationary housing, a cylindrical housing extension surrounding said drill, a tubular attachment in telescopic connection with said extension and shiftable forward to engage and hold down the work while drilling and shiftable rearward to expose the point of the drill for ready positioning thereof in starting a new hole, said attachment being arranged to lie within the grasp of the forwardly positioned hand of the operator, spring means urging said attachment forward, and means for controlling the movement of said attachment, including a lever extending alongside said attachment in position to be encompassed therewith by the forwardly positioned hand of the operator and actuated by a squeezing motion thereof.

17. A portable drilling tool according to claim 16, characterized in that said means for controlling movement of said tubular attachment comprises a link connected at its forward end to the attachment and extending rearwardly toward the stationary housing, and a bell-crank lever pivotally mounted on said housing having one arm connected to said link and the other arm arranged for manual operation as described.

HOWARD R. FISCHER.